United States Patent [19]

Vostovich

[11] Patent Number: 4,459,380

[45] Date of Patent: Jul. 10, 1984

[54] HEAT RESISTING ETHYLENE-PROPYLENE RUBBER AND INSULATED CONDUCTOR PRODUCT THEREOF

[75] Inventor: Joseph E. Vostovich, Bridgeport, Conn.

[73] Assignee: General Electric Company, Schenectady, N.Y.

[21] Appl. No.: 289,610

[22] Filed: Aug. 3, 1981

Related U.S. Application Data

[60] Division of Ser. No. 152,249, May 22, 1980, abandoned, which is a continuation of Ser. No. 11,475, Feb. 12, 1979, abandoned.

[51] Int. Cl.[3] .............................................. C08K 5/34

[52] U.S. Cl. ..................................... 524/94; 524/106; 524/519; 524/526; 525/240; 525/241

[58] Field of Search ................. 524/106, 94, 519, 526; 525/240, 211

[56] References Cited

U.S. PATENT DOCUMENTS

| | | | |
|---|---|---|---|
| 3,378,512 | 4/1968 | Hamed et al. | 525/240 X |
| 3,468,979 | 9/1969 | Hamed et al. | 525/237 X |
| 3,562,790 | 2/1971 | Coover et al. | 525/240 X |
| 3,700,614 | 10/1972 | Schenkerberg | 525/211 |
| 3,806,558 | 4/1974 | Fischer | 525/240 X |
| 3,835,201 | 9/1974 | Fischer | 525/240 X |
| 3,862,106 | 1/1975 | Fischer | 525/240 X |
| 3,904,470 | 9/1975 | Fukuki et al. | 525/211 |
| 4,031,169 | 6/1977 | Morris | 525/240 |
| 4,066,590 | 1/1978 | Eldred et al. | 260/45.85 B |
| 4,125,509 | 11/1978 | Vostovich | 260/42.15 |
| 4,202,801 | 5/1980 | Petersen | 525/237 |
| 4,303,574 | 12/1981 | Vostovich | 524/264 |

OTHER PUBLICATIONS

"Heat Resistance of Nordel" (A-55375), E. I. DuPont de Nemours and Co., Bulletin No. 6.

DuPont Nordel—Nordel 1040/Nordel 1070, (ND-220, 1040/1070, E-13994).

DuPont "Nordel" 2522/Nordel 2722, (ND230.2522/2722).

Nordel—Nordel 1040/Nordel 1070 ("A").

*Primary Examiner*—Melvyn I. Marquis

*Attorney, Agent, or Firm*—Donald J. Voss

[57] ABSTRACT

A crosslink curable ethylene-propylene rubber composition with improved resistance to heat shock, the cured rubber composition and electrical conductors insulated with said cured rubber composition. The improved rubber composition comprises a combination of ethylene-propylene rubbers of different structural orientation, and antioxidants.

10 Claims, 1 Drawing Figure

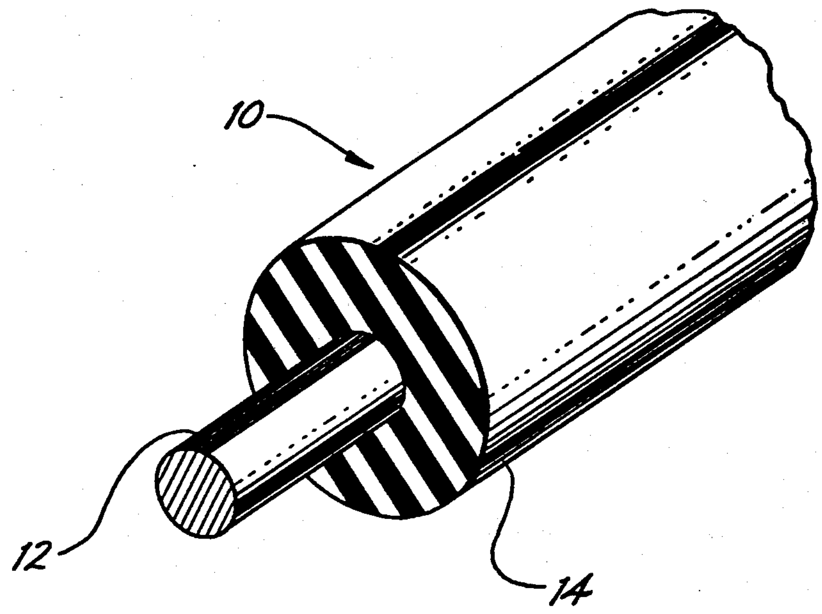
10
12
14

HEAT RESISTING ETHYLENE-PROPYLENE RUBBER AND INSULATED CONDUCTOR PRODUCT THEREOF

This is a division of application Ser. No. 152,249, filed May 22, 1980 and now abandoned, which is a continuation of Ser. No. 011,475, filed Feb. 12, 1979, now abandoned.

BACKGROUND OF THE INVENTION

Loss of elasticity, or embrittlement, upon exposure to above ambient temperatures has been a longstanding impediment of many common elastomers. The deteriorating effect of heat upon elastomers, or their elastic properties, has prompted continuing efforts and the use of a variety of remedial measures to improve their resistance to heat, such as the development and use of new elastomer compound formulations, and antioxidants or agents which block the action of oxygen or free radical forming ingredients.

The characteristic loss of elasticity or embrittlement of elastomers is a particularly significant and critical problem in the electrical insulating field wherein conductors insulated with heat degradable elastomers are utilized in areas which are exposed to high temperatures, such as leads or wires in or about motors and transformers, or within apparatus containing heating elements or which are otherwise disposed in locations encountering high temperatures.

SUMMARY OF THE INVENTION

This invention comprises a novel rubber composition of a specific combination of ethylene-propylene rubbers, and compounded ingredients and proportions thereof which has significantly improved resistance to heat, or heat aging, and heat shock, along with satisfactory physical and electrical properties. The heat resistant rubber composition of this invention is composed of an essential combination of ethylene-propylene rubbers of different molecular structure orientation, and antioxidants in particular proportions, and can include optional components which enhance the overall attributes of the compound composition. The invention additionally includes electrical conductors insulated with the highly heat resistant ethylene-propylene rubber compound.

OBJECTS OF THE INVENTION

It is a primary object of this invention to provide a novel rubber compound composition having increased resistance to high temperatures.

It is a further object of this invention to provide a novel curable rubber compound and products thereof which withstand high temperatures and exhibit stable chemical, physical and electrical properties over extended periods of exposure to elevated temperatures.

It is an additional object of this invention to provide a crosslink cured ethylene-propylene rubber compound that is resistant to embrittlement and cracking, or loss of elasticity upon prolonged heating and possesses physical and electrical attributes which render it advantageously suitable for use as an electrical insulating material for conductors such as wire and cable.

It is also a primary object of this invention to provide a new and improved heat resistant electrical conductor product insulated with a cured elastomer composition having a high tolerance to elevated temperature and apt physical and electrical properties whereby the insulating material substantially maintains its original elastic, flexible and dielectric characteristics through its service life regardless of temperature conditions.

It is a specific object of this invention to provide an ethylene-propylene rubber compound composition possessing apt electrical properties, abrasion and tear resistance, flexibility and elasticity, and which retains these attributes notwithstanding high temperature conditions, and an improved heat stable electrical insulation thereof.

BRIEF DESCRIPTION OF THE DRAWING

The drawing comprises a perspective view of a section of an electrical conductor insulated with the novel and improved rubber composition of this invention.

DETAILED DESCRIPTION OF A PREFERRED EMBODIMENT

This invention specifically consists of a novel combination of semi-crystalline and amorphous ethylenepropylene rubbers with other compound ingredients comprising antioxidants, and relative proportions thereof, which in total produce an elastomeric composition having outstanding stability and resistance to deterioration and loss of elasticity upon subjection to elevated temperatures over extended periods.

The rubber composition of this invention comprises the combination, in approximate parts by weight, consisting essentially of:

| | |
|---|---|
| Ethylene-propylene rubber, semi-crystalline | 80 |
| Ethylene-propylene rubber, amorphous | 10–40 |
| Hydrated alumina filler | 50–150 |
| Zinc oxide | 10–30 |
| Paraffin | 0–15 |
| Polychloroprene | 0–15 |
| Antioxidant | 2–8 |
| Vinyl silane | 0–5 |
| Peroxide crosslink curing agent | 2–8 |

The ethylene-propylene rubber components of amorphous or semi-crystalline molecular structure comprise ethylene-propylene copolymers and terpolymers of typical commercially available compositions constituting about 25 to about 75 parts by weight of ethylene monomer copolymerized with about 75 to about 25 parts by weight of propylene monomer. Terpolymers of ethylene-prolylene include those commercial rubbers produced by the copolymerization of ethylene and propylene together with minor proportions of dienes such as ethylidene norbornene, dicyclopentadiene and 1,4-hexadiene.

A fundamental aspect of the heat shock resistant composition of this invention is the inclusion therein of a combination of semi-crystalline and amorphous ethylenepropylene rubber materials, with each type of rubber present in significant amounts, namely, at least about one part by weight of the amorphous rubber per 8 parts by weight of the semi-crystalline rubber, and ranging up to a weight ratio of about one part amorphous to 2 parts semi-crystalline rubber. In a preferred embodiment of the invention the weight ratio of ethylene-propylene rubbers is approximately 4 parts of semi-crystalline material to one part of amorphous.

The semi-crystalline ethylene-propylene rubber materials found to be useful in the practice of this invention possess a crystalline structure of at least about 8 percent, and typically exhibit a degree of crystallization in a range of about 8 to about 30 percent. An example of a suitable semi-crystalline ethylenepropylene rubber is du Pont's "NORDEL" 2722 EPDM polymer.

Exemplary of substantially amorphous polymers for use in this invention are du Pont's "NORDEL" 2522 EPDM polymer and "NORDEL" 1070 terpolymer.

Antioxidants for use in the composition of this invention particularly comprise a combination of a sterically hindered phenol with a zinc salt of a mercaptoimidazole. Preferred hindered phenols comprise conventional sterically hindered ditertiary butyl mono and poly 2,6-di-t-butyl phenols. For example, tetra kis [methylene-3 (3',5'-di-tert-butyl-4'-hydroxy phenyl) propionate] methane, sold under the trade designation Irganox 1010 by Ciba-Geigy; thioester bis hindered phenol, sold under the trade designation Irganox 1035 by Ciba-Geigy; octadecyl 3-(3',5'-di-tert-butyl-4'-hydroxy phenyl) propionate, sold under the trade designation Irganox 1076 by Ciba-Geigy and, 1,3,4,-trimethyl-2,4,6-tris (3',5'-di-tert-butyl-4'-hydroxy phenyl) benzene, sold under the trade designation Antioxidant 330 by Ethyl Corp. Other hindered phenol antioxidants are listed in U.S. Pat. No. 3,979,180.

The zinc salt of a mercaptoimidazole component for this invention comprises a zinc salt of a 2-mercaptobenzimidazole sold under the trade designation Vulkanox ZMB by Mobay Chemical, or a zinc salt of 2-mercaptotolylimidazole sold under the trade designation Vanox ZMTI by R. T. Vanderbilt or Vulkanox ZMB-2 by Mobay Chemical.

Peroxide crosslink curing agents for the ethylene-propylene rubber compound of this invention comprise the free radical forming organic peroxides such as tertiary peroxides characterized by at least one unit of the structure

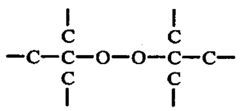

which is activated by its decomposition at temperatures in excess of about 295° F. The use of such peroxides in crosslinking polymers is described in detail in U.S. Pat. Nos. 2,888,424; 3,070,379; and 3,214,422. A commonly used and preferred curing agent for this invention is dicumyl peroxide. Other useful peroxide curing agents include the tertiary diperoxides such as 2.5-dimethyl-2,5 (t-butyl peroxy) hexane, and 2,5-dimethyl-2,5 di (t-butyl peroxy) hexyne-3, and the like diperoxy compounds.

It is believed that the polychoroprene and vinyl silane components contribute in some manner with the overall combination of the other basic ingredients to the thermal stability or endurance of the cured ethylene-propylene rubber composition of this invention. Polychloroprene and vinyl silane therefore should be included in a preferred embodiment of this invention, at least in amounts of about 3 parts by weight of polychloroprene and about 0.5 parts by weight of vinyl silane.

A processing aid, such as paraffin, is generally desirably included in the rubber composition of this invention to facilitate the compositions preparation and handling such as the mixing or compounding of its ingredients and/or its forming and consolidation into a product shape by molding or extrusion. Processing aids include oils, waxes and jellies derived from petroleum or hydrocarbon sources and they serve to unite the ingredients into a coherent and uniform workable plastic mass and/or to provide a lubricant therein.

The following comprise examples illustrating specific embodiments of this invention and demonstrate compounds thereof having a high level of resistance to heat shock and thermal deterioration.

The compounds of each example of this invention were all prepared in an identical manner, comprising first admixing all components, except the peroxide curing agent and vinyl silane, in a banbury internal mixer for about 9 minutes while the temperature increases to about 120° to 150° C. After cooling to room temperature, the peroxide curing agent and vinyl silane were added to the admixture dispersed through the other ingredients by mixing about 2 to 4 minutes.

Compositions of examples of this invention were as follows in approximate parts by weight:

| | EXAMPLES | |
|---|---|---|
| | I | II |
| Ethylene-propylene rubber semi-crystalline (duPont "Nordel" 2722) | 80 | 80 |
| Ethylene-propyleme rubber - amorphous | | |
| (duPont "Nordel" 2522) | 20 | |
| (duPont "Nordel" 1070) | | 20 |
| Hydrated alumina filler | 100 | 100 |
| Zinc oxide | 15 | 15 |
| Paraffin | 5 | 5 |
| Polychloroprene (duPont Neoprene WRT) | 8 | 8 |
| Antioxidant | | |
| zinc salt of 2-mercaptotolylimidazole (R.T. Vanderbilt - Vanox ZMTI) | 4 | 4 |
| tetra kis [methylene-3(3',5'-di-tert-butyl-4'-hydroxyl phenyl) propionate] methane (Ciba-Geigy - Irganox 1010) | 2 | 2 |
| Vinyl silane | 1.5 | 1.5 |
| Peroxide crosslink curing agent α,α'-bis(t-butyl peroxy) diisopropyl benzene (Hercules - Vulcup R) | 3 | 3 |

Samples of the foregoing compositions of the examples of this invention were prepared by extrusion on a metal conductor in a wall thickness of about 0.045 inch, and crosslink cured by heating same to a temperature of about 205° C. for a period of about 1.5 to 2 minutes.

Referring to the drawing, there is shown a typical construction for an insulated electrical wire or cable product 10, comprising a metallic conductive element 12 and an overlying body of cured elastomeric insulation 14 extending thereabout or covering the conductor. In the drawing, the product 10 is illustrated as a short section with the insulation 14 removed from the end portion of the conductor 12. According to one embodiment of this invention, the novel heat resistant ethylene-propylene rubber compound composition thereof can be used to provide or form the insulation 14 on a conductor 12 of wire or cable product 10. It is to be understood from the foregoing, however, that the insulation can comprise a coating on any portion of a conductive element and that the insulation need not completely enclose the element where such is not necessary for a desired insulative effect.

Although the invention has been described with reference to certain specific embodiments thereof, numerous modifications are possible and it is desired to cover all modifications falling within the spirit and scope of this invention.

What I claim as new and desire to secure by Letters Patent of the United States is:

1. A curable ethylene-propylene rubber composition having improved resistance to heat shock and apt electrical and physical properties, comprising the combination in approximate parts by weight of:

| | |
|---|---|
| Ethylene-propylene rubber, semi-crystalline | 80 |
| Ethylene-propylene rubber, amorphous | 10–40 |
| Hydrated alumina filler | 50–150 |
| Zinc oxide | 10–30 |
| Paraffin | 0–15 |
| Polychloroprene | 0–15 |
| Antioxidant | 2–8 |
| Vinyl silane | 0–5 |
| Peroxide crosslink curing agent | 2–8 |

2. The crosslink cured product of the ethylene-propylene rubber composition of claim 1.

3. A curable ethylene-propylene rubber composition having improved resistance to heat shock and apt electrical and physical properties, comprising the combination in approximate parts by weight of:

| | |
|---|---|
| Ethylene-propylene rubber, semi-crystalline | 80 |
| Ethylene-propylene rubber, amorphous | 10–40 |
| Hydrated alumina filler | 50–150 |
| Zinc oxide | 10–30 |
| Paraffin | 0–15 |
| Polychloroprene | 0–15 |
| Antioxidants - combination of a sterically hindered di-tertiary butyl phenol with a zinc salt of a mercaptoimidazole | 2–8 |
| Vinyl silane | 0–5 |
| Peroxide crosslink curing agent | 2–8 |

4. The crosslink cured product of the ethylene-propylene rubber composition of claim 3.

5. A curable ethylene-propylene rubber composition having improved resistance to heat shock and apt electrical and physical properties, comprising the combination in approximate parts by weight of:

| | |
|---|---|
| Ethylene-propylene rubber, at least about 8 percent crystalline | 80 |
| Ethylene-propylene rubber, substantially amorphous | 10–50 |
| Hydrated alumina filler | 50–150 |
| Zinc oxide | 10–30 |
| Paraffin | 0–15 |
| Polychloroprene | 3–15 |
| Antioxidants - combination of a sterically hindered di-tertiary butyl phenol with a zinc salt of a mercaptoimidazole | 2–8 |
| Vinyl silane | 0.5–5 |
| Peroxide crosslink curing agent | 2–8 |

6. The crosslink cured product of the ethylene-propylene rubber composition of claim 5.

7. A curable ethylene-propylene rubber composition having improved resistance to heat shock and apt electrical and physical properties, comprising the combination in approximate parts by weight of:

| | |
|---|---|
| Ethylene-propylene rubber, approximately 8 to 40 percent crystalline | 80 |
| Ethylene-propylene rubber, substantially amorphous | 10–40 |
| Hydrated alumina filler | 50–150 |
| Zinc oxide | 10–30 |
| Paraffin | 0–15 |
| Polychloroprene | 3–15 |
| Antioxidant - combination of a sterically hindered di-tertiary butyl phenol with a zinc salt of a mercaptoimidazole in an approximate weight ratio of 1 to 2 | 2–8 |
| Vinyl silane | 0.5–5 |
| Peroxide crosslink curing agent | 2–8 |

8. The crosslink cured product of the ethylene-propylene rubber composition of claim 7.

9. A curable ethylene-propylene rubber composition having improved resistance to heat shock and apt electrical and physical properties, comprising the combination in approximate parts by weight of:

| | |
|---|---|
| Ethylene-propylene rubber, approximately 8 to 30 percent crystalline | 80 |
| Ethylene-propylene rubber, substantially amorphous | 20 |
| Hydrated alumina filler | 100 |
| Zinc oxide | 15 |
| Paraffin | 5 |
| Polychloroprene | 8 |
| Antioxidants - combination of a sterically hindered di-tertiray butyl phenol with a zinc salt of a mercaptoimidazole in an approximate weight ratio of 1 to 2 | 6 |
| Vinyl silane | 1.5 |
| Di-cumyl peroxide crosslink curing agent | 3 |

10. The crosslink cured product of the ethylene-propylene rubber composition of claim 9.

* * * * *